US006799268B1

United States Patent
Boggs et al.

(10) Patent No.: US 6,799,268 B1
(45) Date of Patent: Sep. 28, 2004

(54) BRANCH ORDERING BUFFER (75) Inventors: Darrell D. Boggs, Aloha, OR (US); Shlomit Weiss, Haifa (IL); Alan Kyker, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 620 days.

(21) Appl. No.: 09/607,640

(22) Filed: Jun. 30, 2000

(51) Int. Cl.$^7$ .............................................. G06F 9/38
(52) U.S. Cl. ........................................................ 712/228
(58) Field of Search ........................................ 712/228

(56) References Cited

U.S. PATENT DOCUMENTS 5,586,278 A    12/1996  Papworth et al.
5,649,136 A  *  7/1997  Shen et al. ................. 712/244
6,026,477 A     2/2000  Kyker et al.

OTHER PUBLICATIONS

U.S. patent application titled "A Processor Having a Rat State History Recovery Mechanism," Ser. N. 09/472,840, filed Dec. 28, 1999.

* cited by examiner

Primary Examiner—William M. Treat
(74) Attorney, Agent, or Firm—Jeffrey S. Draeger (57) ABSTRACT

A branch ordering buffer. One disclosed apparatus includes a processor state management circuit to maintain a primary state and a shadow state, each of the primary state and the shadow state including mappings from logical registers to physical registers. The primary state is a speculative state. This disclosed apparatus also includes a branch ordering circuit to prevent the shadow state from advancing beyond a branch instruction until commitment of the branch instruction.

19 Claims, 8 Drawing Sheets

BRANCH ORDERING BUFFER

RELATED APPLICATIONS

This application is related to application Ser. No. 09/472,840, entitled "A Processor Having A Rat State History Recovery Mechanism" filed Dec. 28, 1999, now U.S. Pat. No. 6,633,970, and application Ser. No. 09/002,000, entitled "Branch Recovery Mechanism To Reduce Processor Front End Stall Time By Providing Path Information For Both Correct And Incorrect Instructions Mixed In The Instruction Pool" filed Dec. 31, 1997, now U.S. Pat. No. 6,026,477.

BACKGROUND

1. Field

The present disclosure pertains to the field of processors. More particularly, the present disclosure pertains to branch ordering logic that may be used to assist in branch mispredict recovery in a speculative execution, out-of-order processor.

2. Description of Related Art

Improving the performance of computer or other processing systems generally improves overall throughput and/or provides a better user experience. Such improved computer or other processing system performance may be achieved by increasing the rate at which instructions for the system are processed by a processor. Accordingly, it is desirable to produce advanced processors with improved instruction throughput.

Continuing to increase the performance of a processor, however, is a difficult task. Prior art and processors already employ techniques of branch prediction, speculative execution, and out-of-order (OOO) execution. Speculative execution allows conditional branches to be predicted rather than awaiting computation of the condition. In general, the branch prediction is usually correct and therefore the speculation improves performance. When branch mispredicts occur, however, the results of the incorrect speculation must be undone.

One technique of undoing or "unwinding" mistakes (i.e., mispredicted branches) is described in U.S. Pat. No. 5,586,278 (the '278 patent). The processor described by the '278 patent uses a separate retirement register file (RRF) to maintain the committed architectural register state of the processor. Thus, changes in register values are not committed to the RRF until branch predictions are resolved.

Accordingly, in a processor such as that described in the '278 patent, the committed state of registers does not reflect the results of any branches unless they are known to have been properly predicted. While the use of such a separate register file may have its advantages, it may disadvantageously require register values to be copied from a set of renamed registers to the retirement register file upon instruction retirement. In some cases, this type of register value transfer may be a disadvantageously time consuming operation. Furthermore, such prior art processors may rely on flushing all or large portions of the processor pipeline upon mispredicts.

As more complicated, faster, or otherwise different speculating OOO processor architectures evolve, there is a continuing need for logic which facilitates rapid recovery from mispredicted branches without unduly slowing other operations.

BRIEF DESCRIPTION OF THE FIGURES

The present invention is illustrated by way of example and not limitation in the figures of the accompanying drawings.

DETAILED DESCRIPTION

The following description provides a branch ordering buffer. In the following description, numerous specific details such as register names and logic partitioning/integration choices are set forth in order to provide a more thorough understanding of the present invention. It will be appreciated, however, by one skilled in the art that the invention may be practiced without such specific details. In other instances, control structures and gate level circuits have not been shown in detail in order not to obscure the invention. Those of ordinary skill in the art, with the included descriptions, will be able to implement appropriate logic circuits without undue experimentation.

Presently disclosed techniques may allow efficient recovery from mispredicted branches. A shadow state is maintained using a branch ordering buffer so that state management logic may revert to a less speculative state when a mispredicted branch is encountered. The shadow state may be a mapping or a set of pointers to a subset of a pool of renaming registers that is flash-copied to a primary state array to commence execution on the path of actual execution. Such a technique may be efficiently used in a microprocessor that utilizes a pool of registers for both speculative and committed state.

Figure 1:
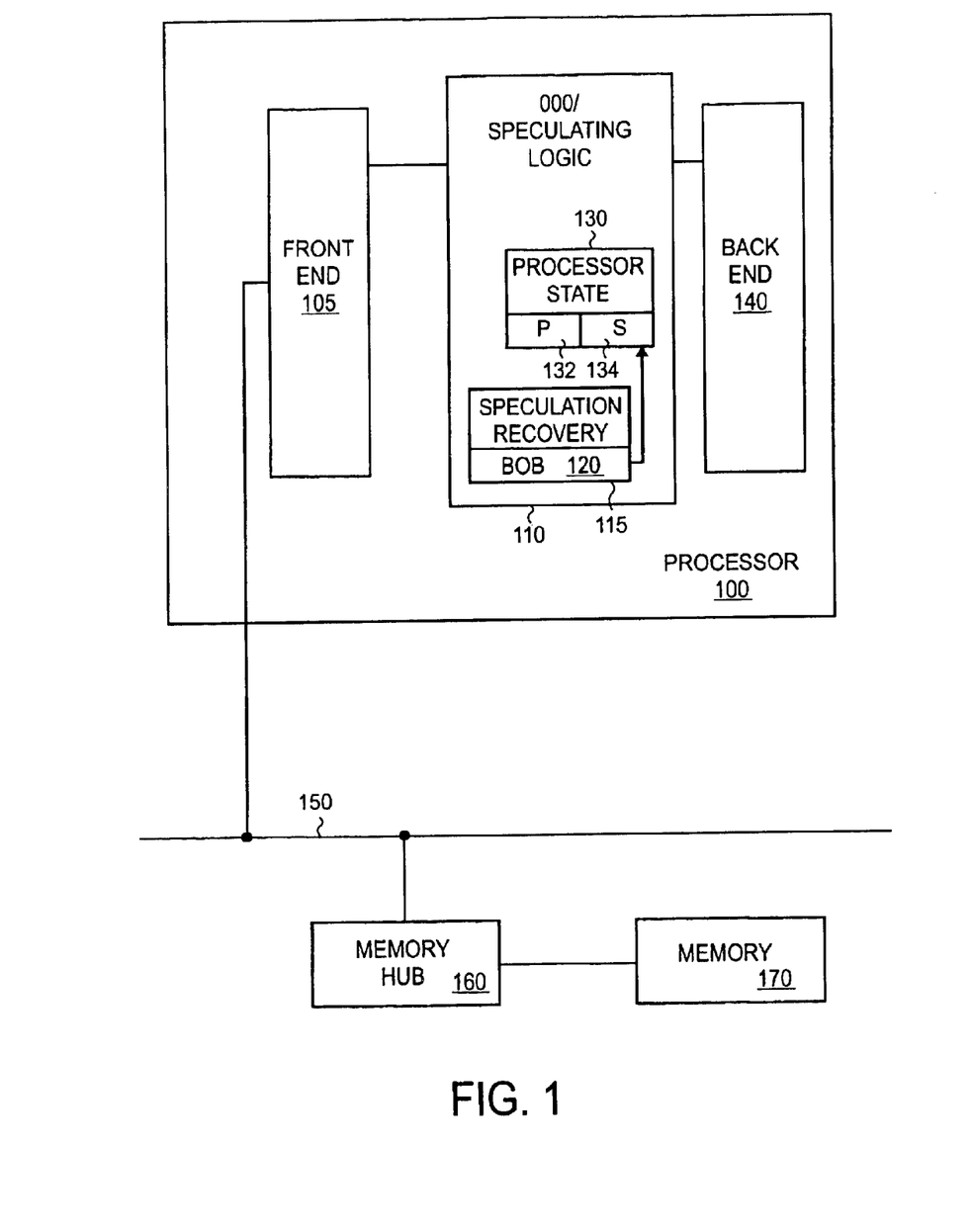
FIG. 1 illustrates one embodiment of a system having a processor that utilizes a branch ordering buffer to facilitate recovery from mispredicted branches.

FIG. 1 illustrates one embodiment of a system having a processor 100 that utilizes a branch ordering buffer (BOB) 120 as a part of speculation recovery logic 115 to facilitate recovery from mispredicted branches. The system includes a memory 170 coupled to a memory hub 160 and a bus 150. The processor 100 is coupled to the bus 150 and communicates with the memory and other system components (not shown) according to known or otherwise available techniques. The processor 100 includes front end logic 105 that fetches and decodes instructions. The front end logic 105 may include a variety of logic entities to improve throughput, such as decoders, caches, prefetchers, branch prediction logic, etc. In any case, instructions, which may be micro-instructions decoded from macro-instructions by the front-end, are passed to the out-of-order (OOO) speculating logic 110. The OOO speculation logic 110 allocates resources for instructions, schedules instructions, and dispatches instructions to execution units for execution. Back end logic 140 completes retirement of instructions.

The OOO speculating logic 110 includes processor state logic 130 which manages the state of various internal registers in conjunction with the speculative execution of instructions. The processor state logic 130 maintains at least a primary state (P) 132 and one shadow state (S) 134. The BOB prevents advancement of the shadow state beyond an unresolved branch, thereby allowing recovery from mispredicted branches to be rapidly performed by copying the shadow state to the primary state.

Figure 2:
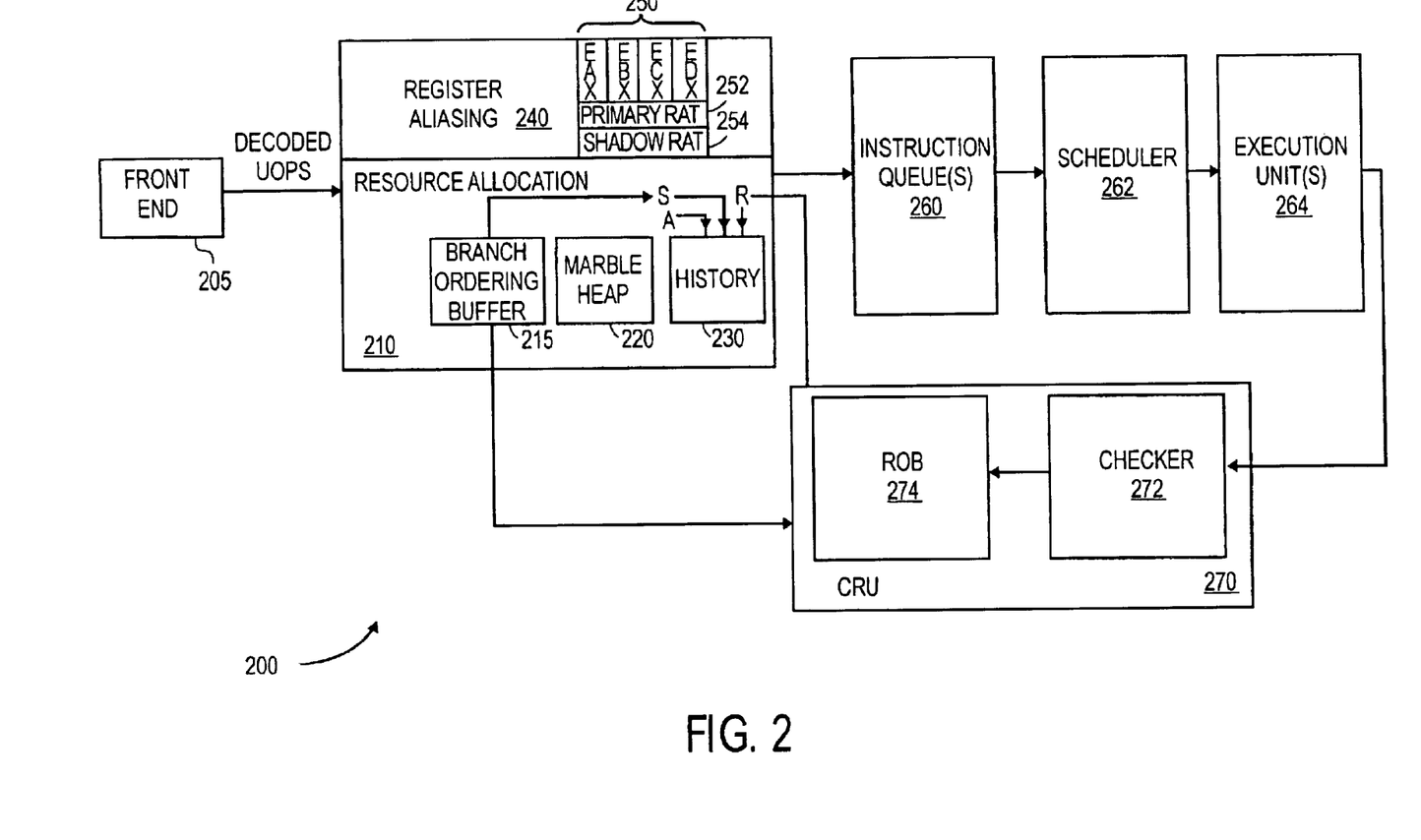
FIG. 2 illustrates one embodiment of a processor utilizing a branch ordering buffer according to presently disclosed techniques.

Further details of one embodiment of a processor 200 utilizing a branch ordering buffer are shown in FIG. 2. In the embodiment of FIG. 2, the processor 200 includes a front end 205 that supplies decoded micro-operations (uOPs) to resource allocation logic 210. After allocating proper resources, the resource allocation logic 210 provides instructions to one or more instruction queue(s) 260 for scheduling by a scheduler 262 and dispatch to execution unit(s) 264. The embodiment of FIG. 2 includes a checker and retirement unit 270 that includes a checker 272 and a re-order buffer (ROB) 274. The checker 272 ensures that instructions have properly executed (e.g., that data speculation was correct or that branches were correctly resolved). The checker and retirement unit 270 communicates with the resource allocation logic 210 to allow advancement of a retirement pointer (R) and to update a branch ordering buffer 215 which in turn allows advancement of a shadow pointer (S).

In general, a history buffer 230 tracks a history of a sequence of uOPs that enter the resource allocation logic 210. As resources are allocated for a uOP, an entry indexed by a uOP sequence number and pointed to by an allocation pointer (A) is updated in the history buffer. Register aliasing logic 240 maintains various register alias tables (RATs) 250 to track the state of various registers. For example, registers such as EAX, EBX, ECX, EDX, stack registers, internal state registers (e.g., microcode registers) and/or other registers may be aliased in some Intel Architecture machines. Other registers may be aliased according to disclosed techniques in other architectures. Registers are allocated by taking a "marble" from a marble heap 220. Each marble is a pointer to a register in a register pool. When registers are freed, their marbles are returned to the marble heap for reuse with other instructions.

A primary register alias table (RAT) 252 holds the most speculative state of the machine. In one embodiment, the primary RAT 252 reflects the registers allocated to the most recently received uOP. After allocation, a uOP is dispatched to the instruction queue(s) 260, the scheduler 262, and the execution unit(s) 264.

The shadow RAT 254 represents a less speculative state of the machine. The branch ordering buffer 215 stores stop indicators corresponding to the sequence numbers of branch uOPs to prevent the shadow pointer (S) from advancing in the history buffer 230 past an unresolved branch. The shadow state held by the shadow RAT 254 is used for state recovery (e.g., by copying the shadow RAT to the primary RAT) when a mispredicted branch is detected. Entries in the branch ordering buffer 215 may be cleared at or after the point in time at which a branch instruction is committed. As referred to herein, the branch commitment point is a stage of execution at which a mispredict would definitely have been detected and after which the direction of the branch is fixed. At the branch commitment point, the branch ordering buffer stop indicator is cleared for correctly predicted branches. The branch instruction may be considered to have successfully completed once it is committed and is no longer speculative. Thus, branches may successfully complete and still have more processing steps before they are completely retired (i.e., when the architectural state is updated).

Figure 3:
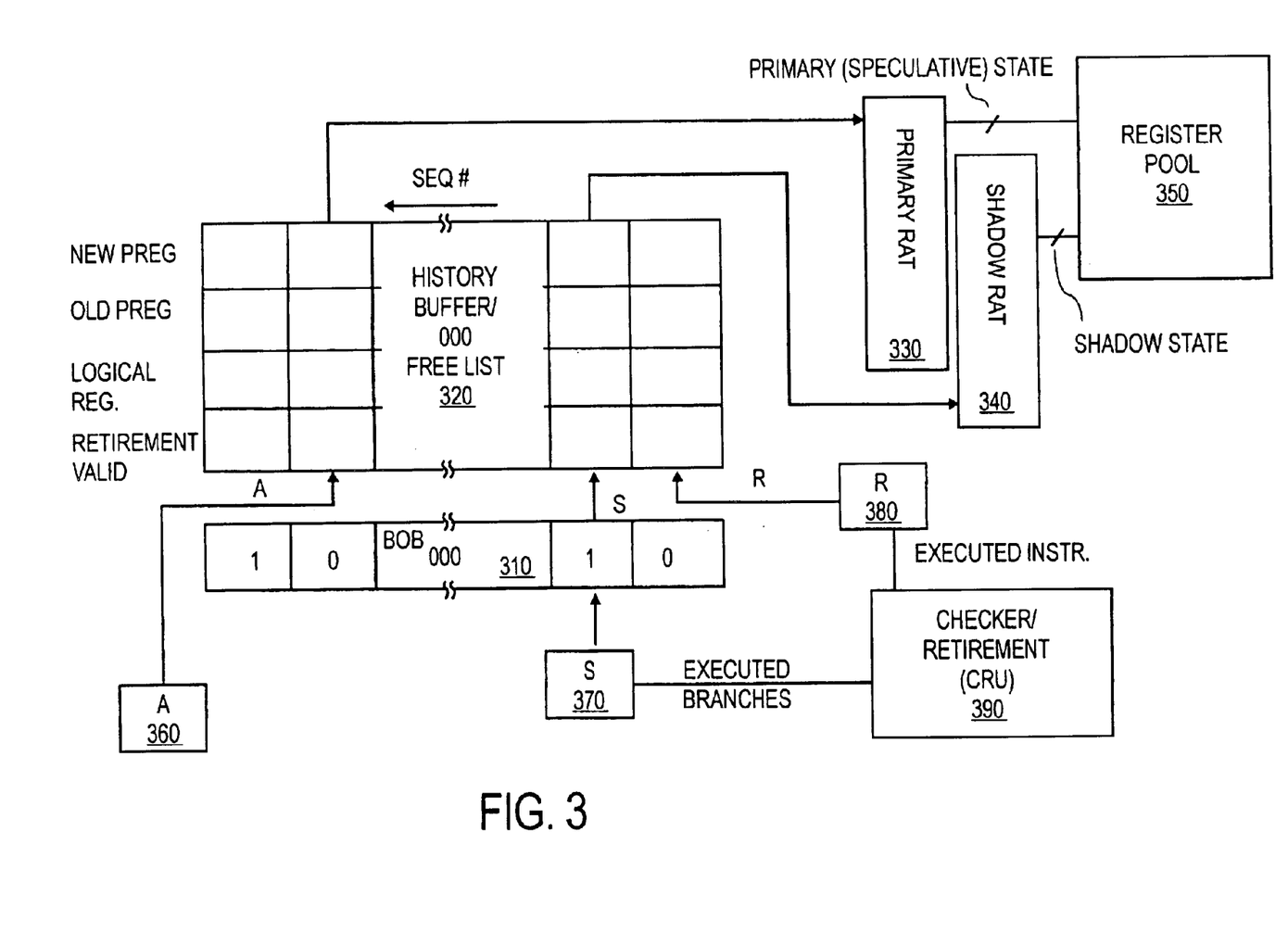
FIG. 3 illustrates one embodiment including processor state management circuitry using a branch ordering buffer.

FIG. 3 illustrates additional details of branch ordering logic and other functionally related logic for one embodiment. The embodiment of FIG. 3 includes a branch ordering buffer 310 that is an array of bits. In the branch ordering buffer 310, a logical value of 1 is used as a stop indicator used to indicate a branch. The branch ordering buffer 310 has entries corresponding to entries in a history buffer 320 (also referred to as a free list). The entries in both the history buffer 320 and the branch ordering buffer 310 are indexed by instruction sequence number, which increases moving from right to left in the illustrated embodiment.

Each entry in the history buffer 320 tracks the effects of renaming of instructions' logical registers to physical registers in a register pool 350 as they are allocated into the machine. The register pool holds a large number (with respect to the number of logical registers) of physical registers used in register renaming. Each history buffer entry indicates which logical register is affected. Each entry also indicates the old physical register (old PREG) that contained the previous value for the affected logical register, as well as the new physical register (new PREG) which will contain the new value for the affected logical register. Each history buffer entry may also contain a bit to indicate whether the entry is still valid or whether it has been retired, although this information may be tracked through the retirement pointer or other means. Each entry may also contain additional fields in other embodiments that affect multiple registers per instruction.

Figure 4:
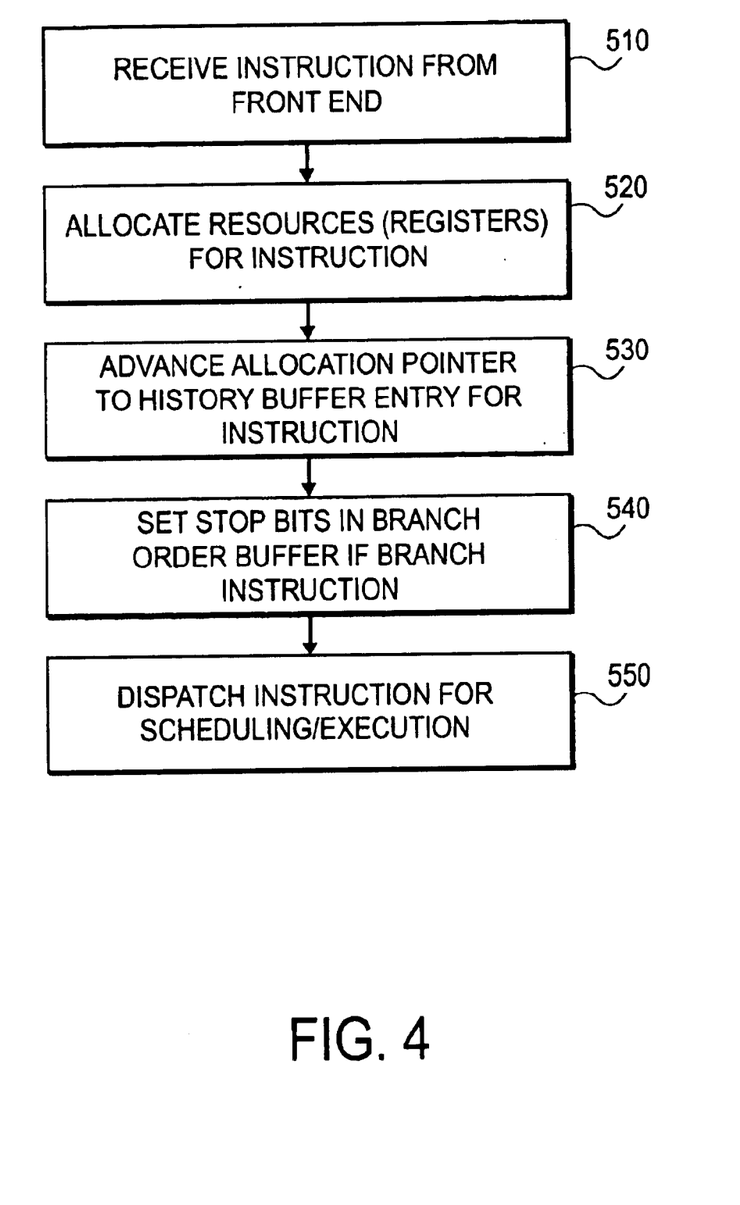
FIG. 4 illustrates operations performed by allocation logic according to one embodiment.

The operations performed by allocation logic 360 in one embodiment are shown in FIG. 4. The allocation logic 360 receives an instruction from the front end logic (e.g., decoders, etc.) as indicated in block 510. The allocation logic 360 allocates registers from the register pool 350 for the instruction as indicated in block 520. As a new physical register is allocated for the result of a new instruction, the appropriate new PREG entry may be updated in the allocated history buffer entry. Additionally, a primary RAT 330 is updated to reflect the new set of physical registers that represent the logical registers for the processor. The allocation logic 360 advances the allocation pointer as indicated in block 530. If an instruction is a branch instruction, a stop indicator bit or bits (e.g., a logical 1) is set in the branch ordering buffer 310 as indicated in block 540. Instructions are subsequently dispatched for scheduling and execution as indicated in block 550. The allocation logic 360 may continue this process resulting in advancement of the allocation pointer as instructions are decoded and received until the history buffer is filled or until events indicate that the path of execution is to be changed.

Figure 5:
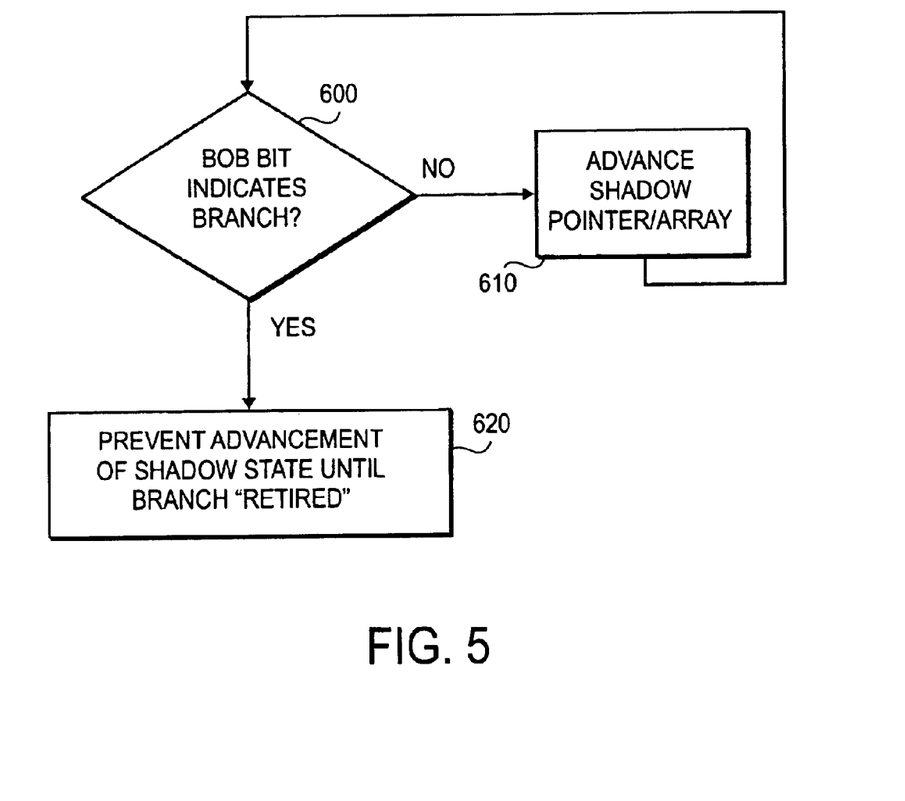
FIG. 5 illustrates operations performed by shadow pointer control logic according to one embodiment.

Shadow logic 370 advances the shadow pointer (S) and shadow state according to a process shown in FIG. 5, in one embodiment. In general, the shadow logic communicates with a checker and retirement unit (CRU) 390 to determine when branches are executed and committed. The shadow logic 370 maintains the shadow pointer (S) at or before a branch that has not been committed. The shadow RAT 340 maintains a state representative of the machine state at the instruction corresponding to the entry in the history buffer 320 to which the shadow pointer points. That is, the shadow RAT keeps the mapping for logical registers that exists at the point in time indicated by the shadow pointer. As indicated in block 600, the shadow logic 370 tests whether the current bit in the branch ordering buffer 310 indicates a branch. If not, the shadow pointer is advanced by the shadow logic 370 as indicated in block 610. As the shadow pointer is advanced in the history buffer 320, the shadow RAT 340 is updated. If the current bit in the branch ordering buffer does indicate a branch, then the shadow logic 370 prevents advancement of the shadow state until the branch is committed as indicated in block 620.

In the event that a branch misprediction occurs, the primary RAT state will be incorrect due to the incorrect speculation; however, the state indicated by the shadow RAT in this embodiment is not advanced beyond unresolved branches. Therefore, a mispredict may be unwound by advancing the shadow pointer to the branch, copying the shadow RAT 340 into the primary RAT 330 to restore the state of the registers, and then advancing the shadow pointer to the allocation pointer.

The CRU and the shadow logic 370 may communicate the commitment of a branch in several fashions. The shadow logic 370 and branch ordering buffer 310 may indicate to the CRU which instruction sequence number corresponds to the next branch in the BOB. The CRU sends a clear signal to the shadow logic/BOB when the branch commits. In some embodiments, the BOB may send multiple sequence numbers to the CRU to clear various branches as they commit. In other embodiments, the CRU may send sequence numbers to the BOB. Other techniques may be used provided that the BOB and CRU (or equivalent logic) communicate regarding the commitment of branches. In any of these cases, the BOB is informed when branches commit and similarly retirement pointer logic 380 is informed when instructions retire. The retirement pointer logic 380 responsively advances a retirement pointer (R) when instructions retire so that history buffer entries may be reused.

Multiple branches may be present in the history buffer and indicated in the BOB. For example, a second logical 1 is present in the BOB shown in FIG. 3. Since the processor may execute instructions out of order, the later branch (at the allocation pointer) may complete before the branch pointed to by the shadow pointer. In some cases, the CRU may clear the later (leftmost) bit in the BOB prior to clearing the bit pointed to by the shadow pointer; however, the shadow pointer may not advance beyond the earlier (rightmost) stop bit until that branch is resolved. Branches that are not allowed to commit until all programmatically earlier branches have committed are referred to as fencing branches. Such fencing branches "fence" or serialize the flow of commitment with respect to all previous branches.

Non-fencing branches, on the other hand, are branches which do not serialize the flow of branch instructions. Fencing branches may be used for events that have relatively global effects (e.g., changing code segment registers). Fencing branches may also be convenient or necessary to implement different features depending on the processor architecture and implementation.

Figure 6:
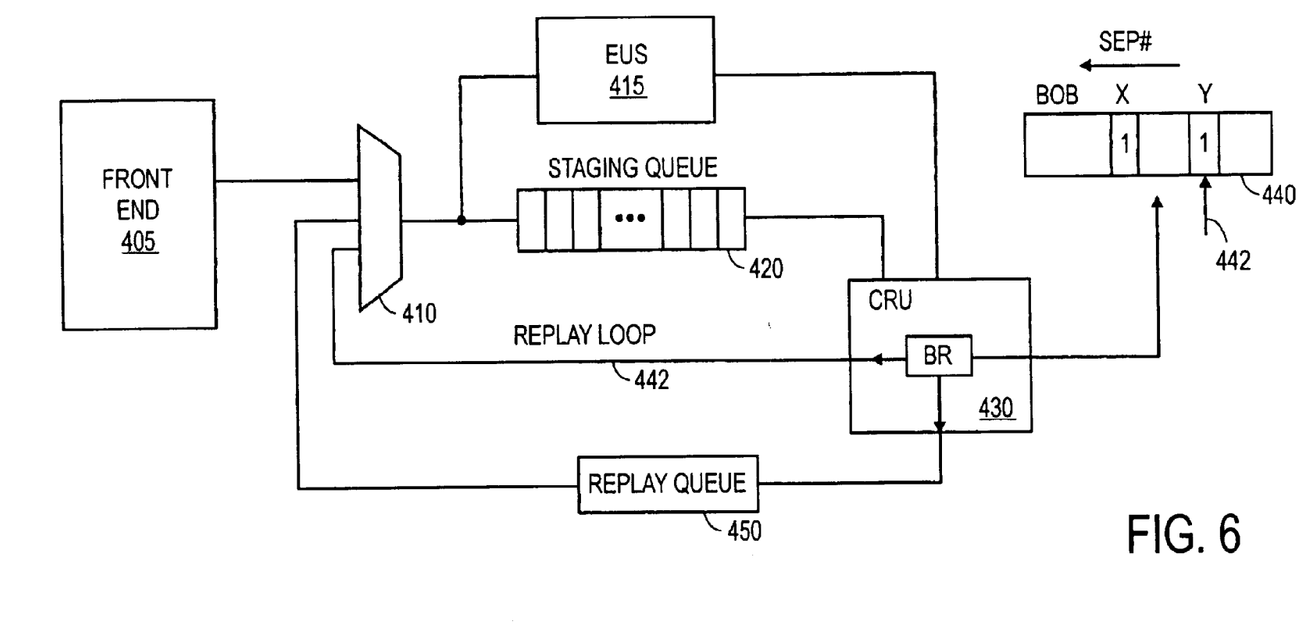
FIG. 6 illustrates one embodiment of a processor that has a replay system that cooperates with a branch ordering buffer.
Figure 7:
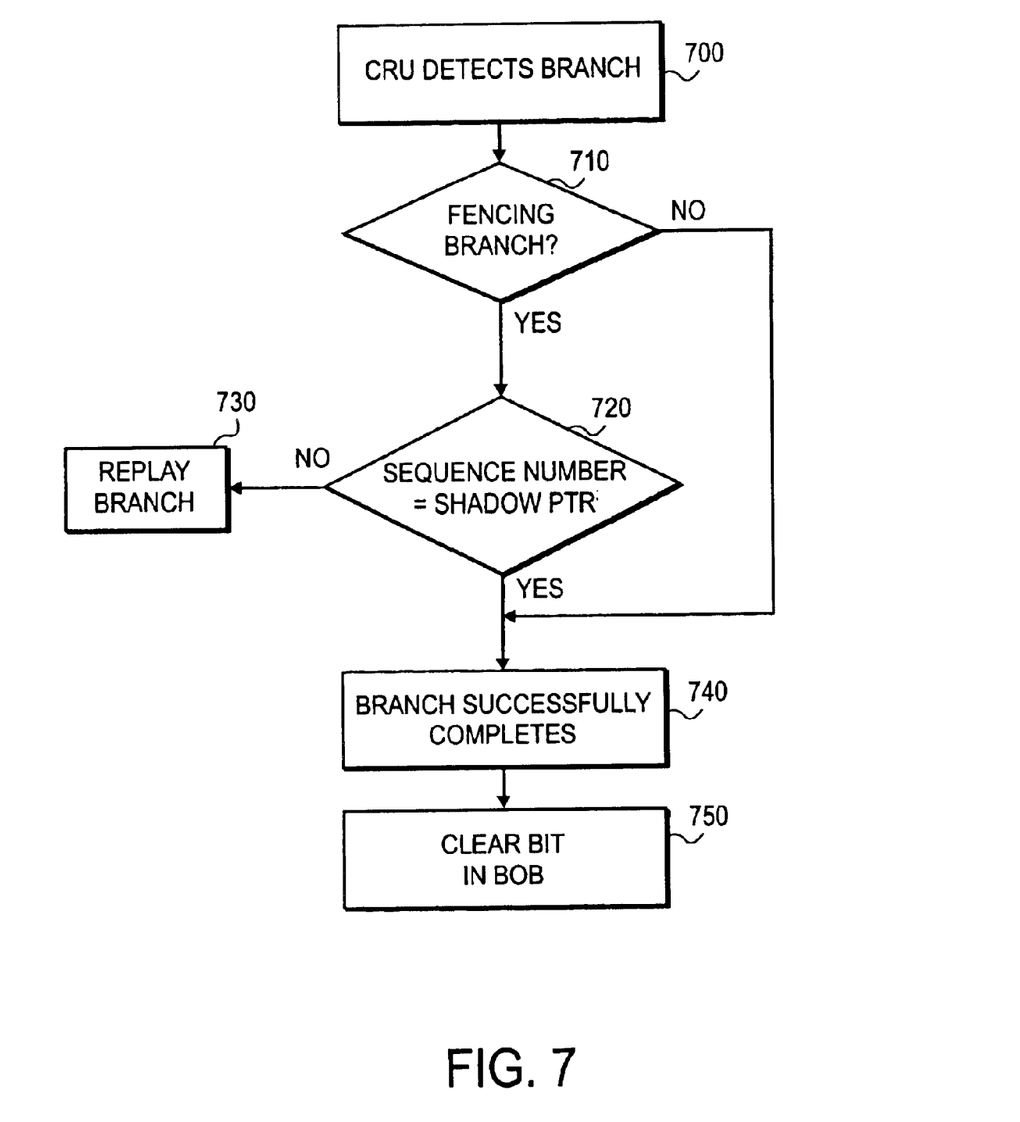
FIG. 7 illustrates operations performed by one embodiment resulting in the clearing of a bit in the branch ordering buffer that prevents advancement of the shadow pointer.

Additional details relevant to the effects of fencing branches are shown in the processor embodiment of FIG. 6 and the flow chart of FIG. 7. In the embodiment of FIG. 6, a front end 405 provides instructions to a replay system. The replay system may be used in an architecture that performs data speculation and replays instructions that complete incorrectly until they properly execute. A multiplexer 410 dispatches instructions from one of a variety of sources to a staging queue 420 and one or more execution units (EUs) 415. The staging queue 420 and the execution units 415 communicate with a checker and retirement unit (CRU) 430 to determine if instructions have executed properly. A branch ordering buffer (BOB) 440 operates as discussed with respect to previous figures.

FIG. 6 shows two branches, X (fencing, not pointed to by BOB/shadow pointer) and Y (non-fencing, pointed to by BOB/shadow pointer 442). As indicated in block 700, the CRU detects that a branch has passed through an execution unit. If a branch is a fencing branch (as tested at block 710), it cannot commit until all preceding branches have committed. In order to determine if a fencing branch is the oldest branch (i.e., that it is not preceded by another branch), the sequence number of the fencing branch is tested in block 720 to determine if it is equal to a sequence number indicated by the shadow pointer. If the sequence number of the fencing branch is not equal to the sequence number indicated by the shadow pointer, the branch (e.g., branch X) should be replayed using either a replay loop 442 or a slower replay queue 450. The branch Y prevents commitment of the branch X and accordingly prevents the clear signal from resetting the BOB indicator for branch X. If the sequence number of the fencing branch is equal to the sequence number, then the fencing branch may be committed because it is the oldest branch, and the process proceeds to block 740.

If the branch tested in block 710 is not a fencing branch, the CRU may detect that it has successfully completed in block 740. In block 740, the branch (either fencing or non-fencing) has been determined to have become late replay safe by the checker and retirement unit (no external causes force replay and all inputs were ready at execution time), it is non-speculative, and it is not mispredicted. In the case of a fencing branch, it is also not preceded by any other non-committed branch. After a branch successfully completes in block 740, the appropriate bit in the BOB may be cleared as indicated in block 750.

Figure 8:
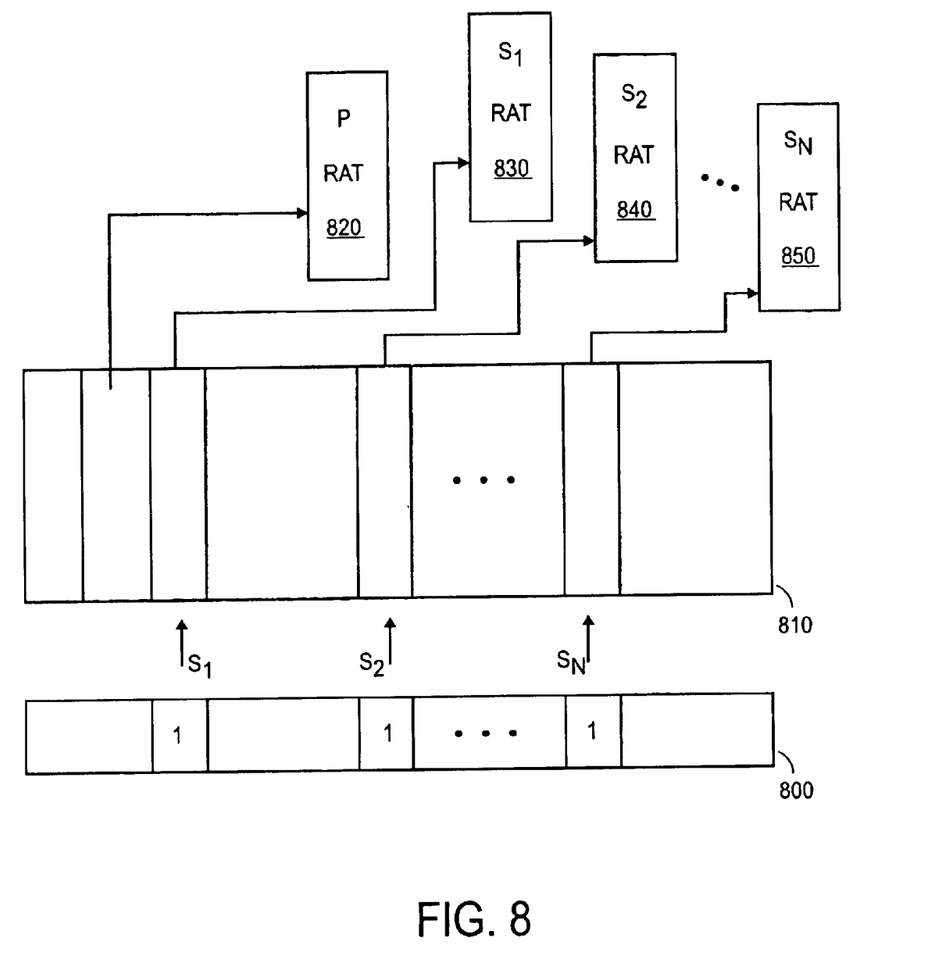
FIG. 8 illustrates one embodiment that maintains multiple shadow states to facilitate rapid recovery back to several different states of speculation.

FIG. 8 illustrates one alternative embodiment that may allow an increased level of speculation while still enabling rapid recovery from branch mispredicts. In particular, the embodiment of FIG. 8 maintains multiple shadow states, each shadow state representing the state existing at a branch instruction. Accordingly, a branch ordering buffer 800 may include multiple logical 1 values indicating multiple branch instructions in a history buffer 810 (as previously described). In the embodiment of FIG. 8, however, multiple shadow pointers $S_1$–$S_N$ point to various branch instructions in the history buffer 810 and multiple shadow RATs $S_1$ 830, $S_2$ 840, and $S_N$ 850 maintain the register state at the time of each branch instruction until the branch instruction is resolved.

The use of multiple shadow states and multiple shadow pointers allows at least one shadow pointer to be moved beyond an unresolved branch. This shadow pointer is further advanced than may be allowed in cases where only one shadow state is maintained. Having a further advanced shadow pointer may advantageously expedite processing in some cases. For example, if the shadow pointer has not yet moved forward to a branch that is determined to be mispredicted, the logic would otherwise have to wait for the shadow pointer to reach the mispredicted branch before a flash copy of the shadow RAT to the primary RAT 820 is performed. With multiple shadow pointers and multiple shadow RATs, the frequency and length of such delays is likely to be reduced.

Additionally, no loss of speed or depth in mispredict recovery occurs. At least one shadow RAT maintains the state of the oldest uncommitted branch. If there are N−1 uncommitted branches present in the branch ordering buffer, all of the shadow states are consumed. When all of the shadow states are consumed, no further shadow pointer advancement occurs. The oldest shadow state (representing the first-in-time uncommitted branch) is maintained to allow copying the shadow RAT to the primary RAT as a part of a branch mispredict recovery.

Thus, a branch ordering buffer is disclosed. While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art upon studying this disclosure.

What is claimed is:

1. An apparatus comprising:
   a processor state management circuit to maintain a primary state and a shadow state, each of said primary state and said shadow state including mappings from logical registers to physical registers, said primary state being a speculative state; and
   a branch ordering circuit to prevent said shadow state from advancing beyond a branch instruction until commitment of said branch instruction;
   a replay system to perform data speculation and to replay instructions that execute improperly, said replay system to signal said branch ordering circuit when a branch instruction commits, said
   replay system comprising:
      a replay loop;
      a replay queue having a longer delay than said replay loop;
      a multiplexing circuit coupled to receive instructions from instruction decode and fetch logic, from said replay loop, and from said replay queue;
      a checker and retirement unit, said checker and retirement unit being coupled to said replay loop and said replay queue to provide a replayed branch instruction to one of said replay loop and said replay queue if said replayed branch instruction is a fencing branch instruction preceded by a non-committed branch instruction.

2. The apparatus of claim 1 further comprising:
   speculative recovery circuitry to copy said shadow state to said primary state in response to a branch misprediction being detected.

3. The apparatus of claim 1 wherein said processor state management circuit comprises:
   a primary array to store said speculative state;
   a shadow array to store said shadow state;
   logic to update said primary array upon allocation for an instruction;
   logic to update said shadow array upon advancement of said shadow state.

4. The apparatus of claim 3 wherein said processor state management circuit comprises a history buffer coupled to the primary array and said shadow array, said history buffer to store historical physical register to logical register mappings performed for each of a plurality of instructions.

5. The apparatus of claim 4 wherein said processor state management circuit is to maintain a first pointer pointing to a most recently allocated instruction, said first pointer being associated with said speculative state, said processor state management circuit to maintain a second pointer to point to a less speculative instruction in said history buffer than said first pointer.

6. The apparatus of claim 5 wherein said branch ordering circuit comprises a branch order buffer having an array of bits, said branch order buffer having an entry for each of said plurality of instructions.

7. The apparatus of claim 6 wherein said branch ordering circuit prevents said second pointer from advancing beyond any uncommitted branches.

8. The apparatus of claim 1 wherein said processor state management circuit comprises a plurality of shadow states, each of said plurality of shadow states having a different and lesser degree of speculation than said primary state, said branch ordering circuit to free one of said plurality of shadow states when an associated branch instruction is successfully executed.

9. The apparatus of claim 8 wherein said branch ordering circuit is to prevent further shadow pointer advancement when all of said plurality of shadow states are in use to shadow states existing at prior points of speculation.

10. An apparatus comprising:
    a processor state management circuit to maintain a primary state and a shadow state, each of said primary state and said shadow state including mappings from logical registers to physical registers, said primary state being a speculative state; and
    a branch ordering circuit to prevent said shadow state from advancing beyond a branch instruction until commitment of said branch instruction, wherein said branch ordering circuit comprises an array of bits corresponding to instructions referenced by a sequence number, each bit indicating whether or not a particular instruction is a branch operation that should prevent advancement of said shadow state beyond said branch operation.

11. A branch ordering circuit comprising:
    a branch order buffer; and
    control circuitry coupled to said branch order buffer, said control circuitry being capable of clearing an indicator in said branch order buffer in response to receiving a signal indicating that a branch has successfully completed, wherein said branch ordering buffer comprises an array of bits corresponding to instructions referenced by a sequence number, each bit indicating whether or not a particular instruction is a branch operation that should prevent advancement of said shadow state beyond said branch operation.

12. The branch ordering circuit of claim 11 wherein said control circuitry is coupled to output a sequence number for a currently shadowed branch to a checker and retirement unit to prevent a fencing branch from committing until the fencing branch is an oldest branch.

13. The branch ordering circuit of claim 12 wherein said control circuitry clears an entry in said branch order buffer upon receiving a clear signal indicating that said shadowed branch successfully completed.

14. A method comprising:
    advancing an allocation pointer to indicate resources allocated to an instruction;
    setting stop indicators for instructions, each stop indicator indicating whether or not a particular instruction is a branch instruction that should prevent advancement of the shadow state beyond said branch instruction;
    clearing stop indicators when the instructions commit; and
    inhibiting advance of a shadow state pointer beyond a stop indicator.

15. The method of claim 14 further comprising:
    unwinding mispredicted branches using a shadow state pointed to by said shadow state pointer.

16. The method of claim 14 wherein setting stop indicators comprises setting bits in a branch order buffer.

17. The method of claim 16 further comprising maintaining a plurality of history buffer entries in a history buffer that correspond to a plurality of entries in said branch order buffer, each of the plurality of history buffer entries tracking, for each instruction, if applicable, a logical register, a location for an old value of said logical register, and a location for a new value of said logical register.

18. The method of claim 17 further comprising:
unwinding a mispredicted branch by restoring logical register locations to old locations held by a shadow state.

19. The method of claim 14 wherein clearing comprises:
sending a sequence number for a branch associated with a stop indication to a checker and retirement unit;

receiving a clear signal when said branch associated with said stop indicator is determined to have been correctly predicted;

resetting said stop indicator in response to said clear signal.

* * * * *